(12) United States Patent
Light-Holets

(10) Patent No.: US 10,214,076 B2
(45) Date of Patent: Feb. 26, 2019

(54) HVAC HEATING OF VEHICLES AND DURING ROAD EMERGENCIES

(71) Applicant: Cummins Inc., Columbus, IN (US)

(72) Inventor: Jennifer K. Light-Holets, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/530,690

(22) Filed: Dec. 9, 2016

(65) Prior Publication Data

US 2018/0162195 A1  Jun. 14, 2018

(51) Int. Cl.
*B60H 1/00* (2006.01)
*G05B 15/02* (2006.01)

(52) U.S. Cl.
CPC ..... *B60H 1/00778* (2013.01); *B60H 1/00771* (2013.01); *G05B 15/02* (2013.01); *B60H 1/00371* (2013.01)

(58) Field of Classification Search
CPC ............ B60H 1/00778; B60H 1/00771; B60H 1/00371; G05B 15/02
See application file for complete search history.

(56) References Cited

U.S. PATENT DOCUMENTS

| | | | |
|---|---|---|---|
| 5,924,406 A | 7/1999 | Kinugasa et al. | |
| 7,302,339 B2 | 11/2007 | Gray | |
| 7,531,977 B2 | 5/2009 | Mazaika | |
| 7,579,801 B2 | 8/2009 | Mazaika | |
| 7,861,547 B2 | 1/2011 | Major et al. | |
| 8,341,971 B2 | 1/2013 | Oyobe et al. | |
| 8,350,722 B2 | 1/2013 | Tewari et al. | |
| 8,615,371 B2 | 12/2013 | Hegar et al. | |
| 9,008,858 B1 | 4/2015 | Payne et al. | |
| 9,352,635 B1* | 5/2016 | Schepmann | B60H 1/00392 |
| 2008/0009988 A1 | 1/2008 | Metzger | |
| 2009/0055046 A1 | 2/2009 | Harumoto et al. | |
| 2011/0172880 A1 | 7/2011 | Tamura | |
| 2012/0266610 A1 | 10/2012 | Lifson et al. | |
| 2015/0274177 A1 | 10/2015 | Payne et al. | |

FOREIGN PATENT DOCUMENTS

| | | |
|---|---|---|
| EP | 2 942 216 | 11/2015 |
| FR | 2780349 | 9/2000 |
| WO | WO03/000513 | 1/2003 |
| WO | WO2011/005459 | 1/2011 |

* cited by examiner

*Primary Examiner* — Yuen H Wong
(74) *Attorney, Agent, or Firm* — Foley & Lardner LLP

(57) ABSTRACT

Systems and methods for managing an environment comfort system includes a control system. The control system is communicatively coupled to a location positioning system. The control system is structured to determine a first time parameter corresponding to a vehicle proximate to a path location, determine a second time parameter corresponding to a path schedule, determine a stop duration corresponding to the vehicle based, at least in part, on the first time parameter and the second time parameter, and generate a command structured to manage an environment comfort system in response to movement of the one or more vehicle components between a current performance level and an adjusted performance level based on the stop duration determined.

18 Claims, 3 Drawing Sheets

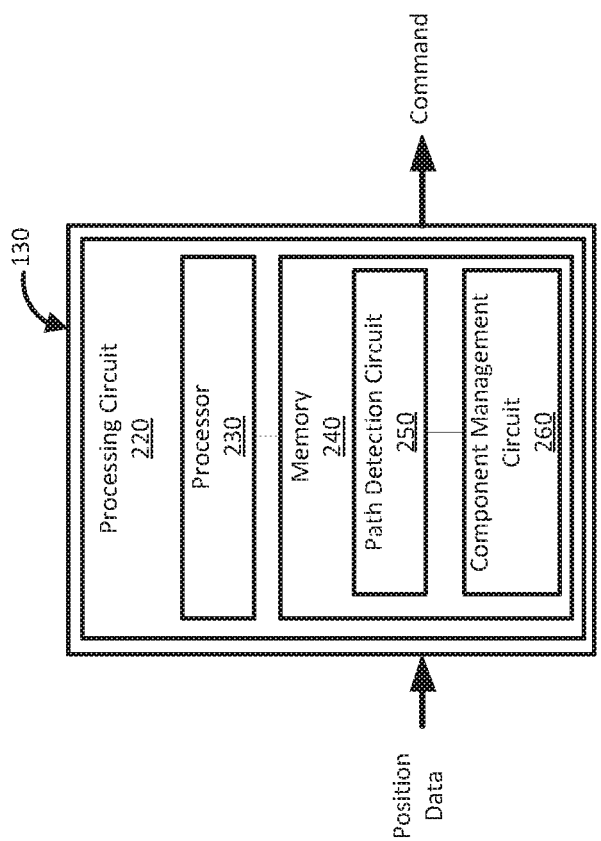

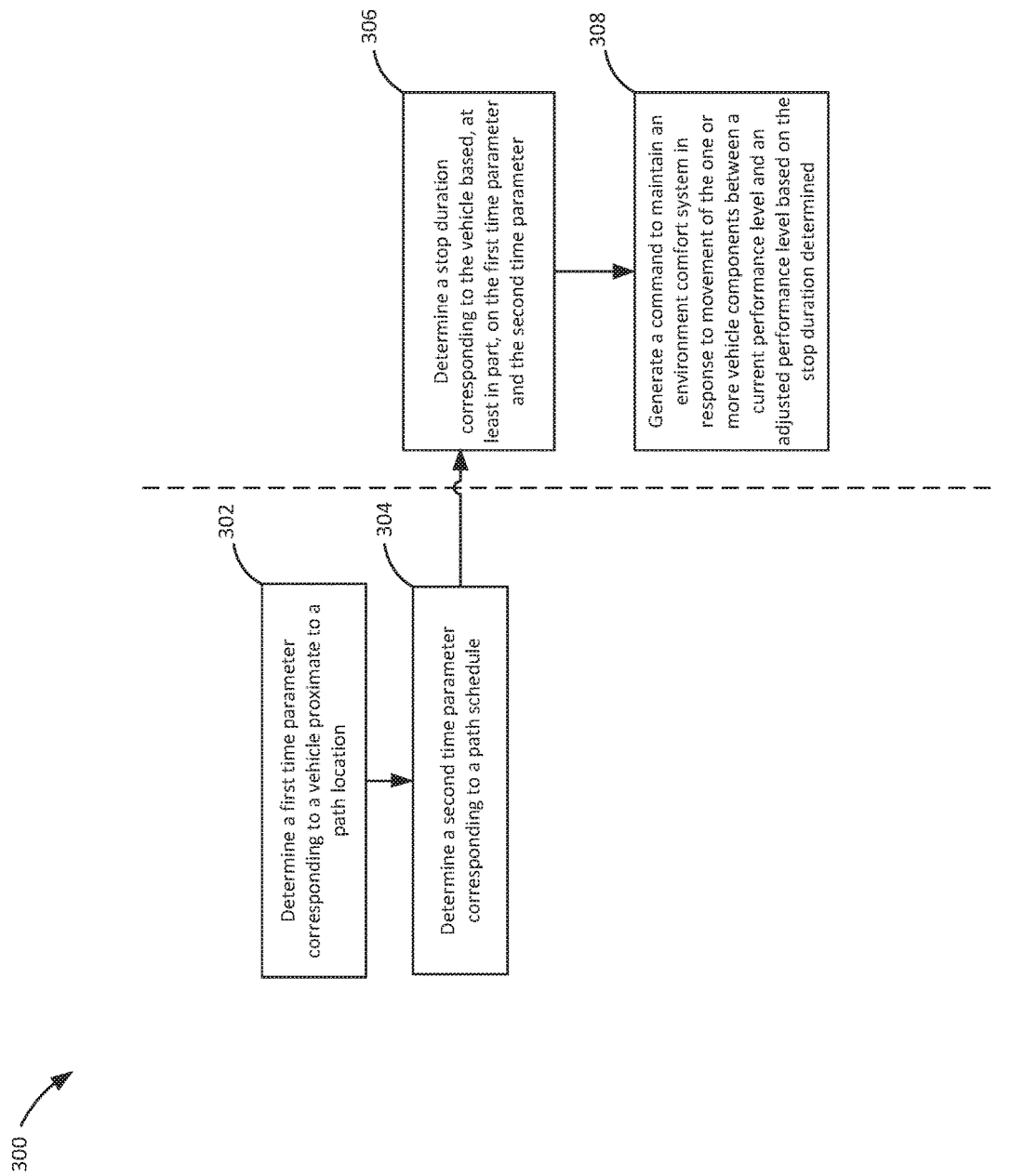

HVAC HEATING OF VEHICLES AND DURING ROAD EMERGENCIES

TECHNICAL FIELD

The present application relates generally to a vehicle management system for managing an environment comfort system.

BACKGROUND

Vehicles sometimes remain running even though the vehicle is not presently moving anywhere. For example, a vehicle such as a bus carries passengers along a predefined route. At times, the bus stops at various locations along the route for an extended period of time to adhere to a posted schedule. In order to maintain the comfort of the passengers and the driver, the engine remains operable (e.g., continues to run) while the bus is stopped to keep the heating, ventilation and air conditioning (HVAC) system working. As another example, in the event of inclement weather, such as snow, or emergency situations, a vehicle may be delayed or stranded for a variable period of time. Again, the engine remains operable in these situations to keep the HVAC system working. Accordingly, a need exists for determining the duration of a stop to minimize the use of vehicle components for powering the HVAC system.

SUMMARY

One implementation relates to a controller structured to determine a first time parameter corresponding to a vehicle proximate to a path location, wherein the vehicle comprises one or more vehicle components, determine a second time parameter corresponding to a path schedule, determine a stop duration corresponding to the vehicle based, at least in part, on the first time parameter and the second time parameter, and generate a command structured to manage an environment comfort system in response to movement of the one or more vehicle components between a current performance level and an adjusted performance level based on the stop duration determined.

Another implementation relates to a method comprising determining a first time parameter corresponding to a vehicle proximate to a path location, determining a second time parameter corresponding to a path schedule, determining a stop duration corresponding to the vehicle based, at least in part, on the first time parameter and the second time parameter, determining a path interference event, and generating a command structured to manage an environment comfort system in response to movement of one or more vehicle components between a current performance level and an adjusted performance level based on at least one of the stop duration determined or the path interference event determined.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

FIG. 2 is a schematic block diagram of a control system included in the vehicle management system according to an example embodiment;

FIG. 3 is a schematic flow diagram of an example method of managing an environment comfort system included in an example vehicle management system.

Figure 1:
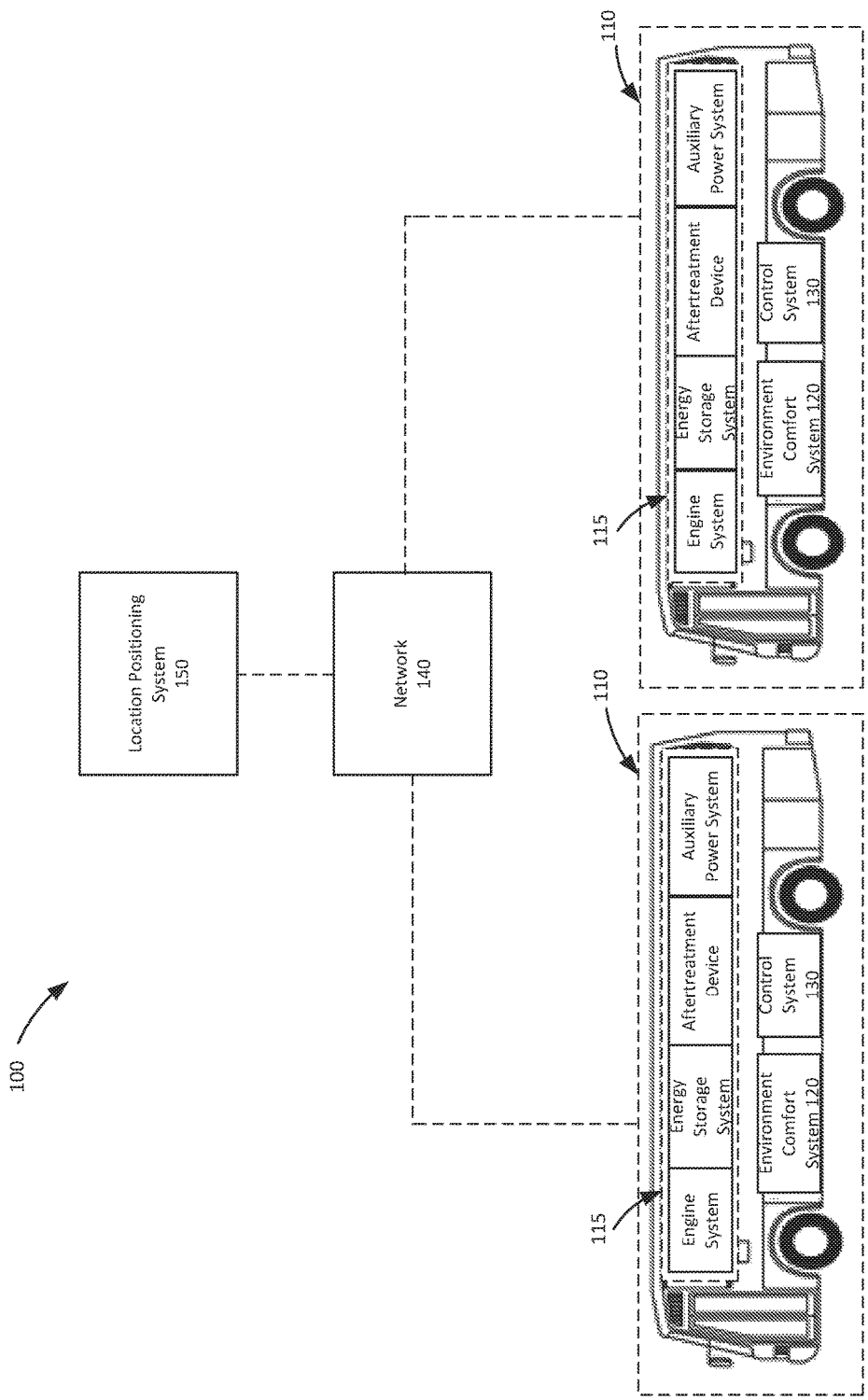
FIG. 1 is a schematic block diagram of an example vehicle management system according to an example embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Embodiments described herein relate generally to a vehicle management system that includes a control system. In this regard, the control system may be structured to determine a first time parameter corresponding to a vehicle proximate to a path location, determine a second time parameter corresponding to a path schedule, and determine a stop duration corresponding to the vehicle based, at least in part, on the first time parameter and the second time parameter. In turn, the control system may be further structured to generate a command structured to manage an environment comfort system in response to movement of one or more vehicle components between a current performance level and an adjusted performance level based on the stop duration determined.

With reference to FIG. 1, a vehicle management system 100 is illustrated. The vehicle management system 100 may be include or otherwise be associated with the vehicle 110 (e.g., a bus or other driver and/or passenger vehicle). In the example of FIG. 1, the vehicle 110 may include, but is not limited to, on-road vehicles (e.g., trucks, etc.), off-road vehicles (e.g., four-wheelers and ATVs, tractors, snowmobiles, etc.), marine vessels (e.g., ships, submarines, boats, yachts, cruise ships, etc.), construction equipment (e.g., concrete trucks, loaders, boom lifts, etc.), mining equipment (e.g., mobile mining crushers, dozers, loaders, etc.), oil and gas equipment (e.g., drilling apparatuses, dozers, loaders, rigs, etc.), or any other type of vehicle. The vehicle 110 includes an environment comfort system 120 (e.g., a heating, ventilation and air conditioning (HVAC) system). Additionally, the vehicle 110 may include one or more vehicle components 115. The vehicle components 115 may include, but is not limited to, an engine system (e.g., an internal combustion engine, diesel engine, etc.), energy storage system (e.g., a battery, supercapacitor, etc.), auxiliary power system (e.g., an electronic auxiliary power unit (eAPU)), or aftertreatment device. Accordingly, the depiction and description of the vehicle 110 contained herein is not meant to be limiting as other types of vehicles 110 and/or vehicle components 115 may be associated with or otherwise used with the vehicle management system 100.

In this example embodiment, the vehicle management system 100 includes a control system 130 (e.g., an electronic control system) communicatively coupled to a location positioning system 130. At least one of the control system 130 or the location positioning system 130 is structured to operate wirelessly via over air transfer, a wireless chip, wireless circuit, wireless communication network (e.g., the network 140), or combination thereof as described herein. It should be understood that the vehicle management system 100 may include additional, less, and/or different components/systems than depicted in FIG. 1, such that the principles, methods, systems, apparatuses, processes, and the like of the present disclosure are intended to be applicable with any other vehicle management system configuration.

As described above, the control system 130 may be structured to operate wirelessly via a wireless chip, wireless circuit, network 140 (e.g., a wireless communication network such as a cellular network, WiFi, Bluetooth®, Internet, local area network (LAN), wide area network (WAN), etc.), standard, protocol, or combination thereof. Accordingly, the control system 130 may be communicatively coupled, via the network 140, to the location positioning system 130 as described herein. Alternatively or additionally, a controller area network (CAN) bus including any number of wired and wireless connections provides the exchange of signals, information, and/or data via the control system 130.

In certain embodiments, the control system 130 includes or is otherwise in communication with circuitry structured to functionally execute the operations of the control system 130. In further embodiments, the control system 130 may include a path detection circuit and/or a component management circuit for performing the operations described in reference to FIGS. 2-3. The description herein emphasizes the structural independence of the aspects of the control system 130 and illustrates one grouping of operations and responsibilities of the control system 130. Other groupings that execute similar overall operations are understood within the scope of the present application. A circuit may be implemented in hardware and/or as computer instructions on a non-transient computer readable storage medium, and such circuits may be distributed across various hardware or computer based components. More specific descriptions of certain embodiments of controller operations are included in the section referencing FIG. 2.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

The vehicle management system 100 includes the control system 130 structured to perform certain operations such as those described herein in relation to FIG. 2. In certain embodiments, the control system 130 forms a portion of a processing subsystem including one or more computing devices having memory, processing, and communication hardware. The control system 130 may include a microprocessor, an application-specific integrated circuit (ASIC), a field-programmable gate array (FPGA), etc., or combinations thereof. The control system 130 may include memory which may include, but is not limited to, electronic, optical, magnetic, or any other storage or transmission device capable of providing a processor, ASIC, FPGA, etc. with program instructions. The memory may include a memory chip, electrically erasable programmable read-only memory (EEPROM), erasable programmable read only memory (EPROM), flash memory, or any other suitable memory from which the control system 130 can read instructions. The instructions may include code from any suitable programming language. The control system 130 may be a single device or a distributed device, and the functions of the control system 130 may be performed by hardware and/or as computer instructions on a non-transient computer readable storage medium.

The control system 130 is also structured to receive, acquire, and/or interpret data from one or more components in or otherwise associated with the vehicle component 110 (e.g., a bus or other vehicle). As such, the control system 130 may be communicably coupled to one or more sensors corresponding to the vehicle component 115. For example, the control system 130 may receive engine speed and engine torque data from each of an engine speed sensor and an engine torque sensor, respectively. For tracking, compartmentalization, and analytics, each piece of data may correspond to a data identifier (DIDs) (e.g., a code, value, etc.). The control system 130 may also receive data from an on-board diagnostics system (e.g., OBD II, OBD I, EOBD, JOBD, etc.). As such, the control system 130 may receive diagnostic trouble codes (DTCs) based on one or more operating characteristics of a component in the vehicle component 110. The DTCs may include fault codes, parameter IDs, etc.

The vehicle management system 100 is also shown to include a location positioning system 150. The location positioning system 150 may be structured as any type of location positioning system (e.g., global positioning system) to track (e.g., according to latitude and longitude data, elevation data, etc.) the location of a vehicle 110 or vehicle component 115, one or more memory devices for storing, transmitting, or receiving tracked data, or any other data associated with the vehicle 110, one or more electronic processing units for processing data, and/or a communications interface for facilitating the exchange of data between the location positioning system 150, and one or more control systems 130. In this regard, the communications interface may be structured as any type of communications interface or protocol including, but not limited to, Wi-Fi, WiMax, Internet, Radio, Bluetooth®, Zigbee, satellite, radio, cellular, GSM, GPRS, LTE, etc.

FIG. 2 is a schematic block diagram of a control system 130 included in the vehicle management system 100 according to an embodiment. The control system 130 is communicatively coupled (e.g., via an over air transfer, the Internet, any type of network as described herein, etc., or a combination thereof) to the location positioning system 150 (e.g., a GPS). In further embodiments, the control system 130 may be communicatively coupled to one or more telematics units such that one or more control systems 130 and/or telematics units are structured to carry out the features as described herein. In the present embodiment, the control system 130 includes a processing circuit 220, a processor 230, memory 240, or other computer readable medium. It should be understood that the control system 130 of FIG. 2 depicts only one embodiment of the control system 130, and any other system capable of performing the operations described herein can be used.

The processor 230 can include a microprocessor, programmable logic controller (PLC) chip, an ASIC chip, or any other suitable processor. The processor 230 is in communication with the memory 240 and structured to execute instructions, algorithms, commands, or otherwise programs stored in the memory 240.

The memory 240 includes any of the memory and/or storage components discussed herein. For example, the memory 240 may include RAM and/or cache of the processor 230. The memory 240 may also include one or more storage devices (e.g., flash drives, hard drives, computer readable media, etc.) either local or remote to the control system 130. The memory 240 is structured to store look up tables, algorithms, or instructions.

The control system 130 includes a path detection circuit 250. The path detection circuit 250 is structured to determine a first time parameter (e.g., a time at or near the time of arrival) corresponding to a vehicle 110 proximate to a path location. For example, the path detection circuit 250 may determine the arrival time of the bus proximate to a bus stop. The path detection circuit 250 is further structured to determine a second time parameter (e.g., a time at or near the time of departure) corresponding to a path schedule (e.g., a route taken by a vehicle to get from one path location to another path location according to a designated time). For example, the path detection circuit 250 may determine the time of departure of the bus from a bus stop as designated in a bus schedule. The first time parameter and/or the second time parameter may be determined according to path location data. As used herein the term path location data may include data associated with the path (e.g., a route, schedule, location, area, zone, region, etc.) of one or more vehicles 110. The path location data may be received, accessed by, or otherwise stored by the path detection circuit 250. Accordingly, the path detection circuit 250 may be structured to determine the first time parameter and/or the second time parameter based on a path pattern (e.g., a pattern associated with the vehicle management system 100 that utilizes the repeatability of a bus schedule and/or operation of the bus or other vehicle). The path detection circuit 250 is structured to generate a path pattern according to at least one of the path location or the path schedule associated with the vehicle 110. To that end, the control system 130 may programmatically utilize machine learning, via machine learning algorithms, programmatic instructions, and/or circuitry, to develop or otherwise generate a path pattern based on the path location data (e.g., a path location or area proximate to the vehicle) and/or the path schedule (e.g., based on the week, holiday, time of day, etc.). The path pattern may be learned according to a particular pattern recognition algorithm that analyzes one or more path locations and/or path schedules based on statistical inferences. In this regard, the machine learning may be unsupervised such that the learning is based on determining a hidden structure from unlabeled data. Alternatively or additionally, the machine learning may be supervised such that the learning is based on inferring a function from a set of training patterns (e.g., path patterns) with each training pattern placed into a classifier. The training patterns may be utilized to map new data and/or determine new inferences such that the algorithm may determine the classification of new data based, in part, on the learned training patterns. For example, the path patterns generated based on the repeatability of the bus schedule, operation, and/or route may be utilized to map new data and/or generate new predictions such as time parameters (e.g., generate predictions of the arrival time, departure time, etc.) associated with the bus or other vehicle 110.

Alternatively or additionally, the path location data may further include data received or otherwise provided by a location positioning system (e.g., the location positioning system 150). As described herein, the control system 130 may be communicatively coupled to the location positioning system 150. In some embodiments, the location positioning system 150 is structured to determine at least one of the first time parameter or the second time parameter from the path location data. In turn, the location positioning system 150 may provide the first time parameter or the second time parameter to the path detection circuit 250. Accordingly, the path detection circuit 250 may receive or otherwise access the path location data and, thereby, determine the first time parameter and/or the second time parameter.

In some embodiments, the path detection circuit 250 is structured to determine a path interference event. The path interference event may include an accident, construction, medical, security, or other emergency occurrence in the path of the vehicle 110. The path interference event may require the use of first responders, emergency personnel, security personnel, construction personnel, traffic personnel, etc. The path detection circuit 250 may receive, via the network 140, a notification and/or data associated with a path interference event. The notification may include a message, news, and/or an alert received or otherwise distributed digitally, via a network, such as by an emergency alert system, cell broadcast messaging, media network, etc. Alternatively or additionally, the notification may be received via user input to indicate a path interference event identified by a user, operator, or passenger of the vehicle 110. In turn, the path detection circuit 250 may determine (e.g., identify) the path interference event based on the notification received. Responsive to the path interference event a command structured to manage the environment comfort system 120 may be generated as described herein below. In some embodiments, the notification may be output (e.g., via the onboard diagnostic system (OBD), a display associated with the vehicle, vehicle dash, infotainment system, information system, or any device configured for in-app notifications, short message service message, audio message, video, streaming content, or any other digital content) to communicate the path interference event to an operator or passenger of the vehicle 110.

The control system 130 includes a component management circuit 260. The component management circuit 260 is structured to determine a stop duration (e.g., the amount of time the bus may be stopped) corresponding to the vehicle based, at least in part, on the first time parameter and the second time parameter. For example, the component management circuit 260 may determine the stop duration as a function of time between the first time parameter (e.g., the arrival time of the bus) at a path location (e.g., a bus stop or area proximate to a bus stop) and the second time parameter (e.g., the departure time). One or more parameters may be associated with one or more vehicle components 115. The parameters include, but are not limited to, the ambient temperature, cabin temperature, aftertreatment device temperature, etc. Alternatively or additionally, the component management circuit 260 may be further structured to determine, or otherwise receive, the one or more parameters via one or more sensors associated with the one or more vehicle components. The one or more vehicle components 115 may then be moved between a current performance level and an adjusted performance level based, at least in part, on the parameters and/or the stop duration as described herein below. For example, the environment comfort system (e.g., HVAC system) may be moved (e.g., powered on, shut off, adjusted with respect to running time, adjusted with respect to temperature settings), while the engine system (e.g., the internal combustion engine) run time is reduced in response to the stop duration and/or the parameters (e.g., the ambient temperature, cabin temperature, etc.) determined.

Advantageously, the determination of the stop duration reduces the amount of time the vehicle components (e.g., the internal combustion engine) operate or otherwise run, while maintaining operator and passenger comfort.

The component management circuit 260 is further structured to generate a command structured to manage an environment comfort system (e.g., the environment comfort system 130) in response to movement of one or more vehicle components between a current performance level and an adjusted performance level based on the stop duration determined. The command may adjust the respective performance level of the one or more vehicle components such as the engine system (e.g., the internal combustion engine), energy storage system (e.g., the battery), and/or the auxiliary power system (e.g., the eAPU) to, thereby, manage the environment comfort system. For example, the component management circuit 260 is further structured to generate a command to manage the environment comfort system (e.g., increase the temperature of the HVAC system) in response to movement of the energy storage system (e.g. the battery) between the current performance level (e.g., a powered-on battery) and the adjusted performance level (e.g., a powered-off battery) based on the stop duration determined (e.g., 10-12 minutes, 15 minutes, or any other duration determined) such that electrical energy is conserved from the reduced use of the energy storage system. An electrical load may be provided to the engine system to cause the engine system to efficiently increase its temperature (e.g., to cause the engine to heat up efficiently). The electrical load, in turn, converts electrical energy which is utilized to heat the vehicle 110 by the environment comfort system 130. In this regard, the electrical energy may be converted to manage the environment comfort system 130 according to the stop duration determined.

In further embodiments, the component management circuit 260 is further structured to generate a command structured to manage the environment comfort system in response to movement of the one or more vehicle components between the current performance level and the adjusted performance level based on the path interference event determined. As described herein, the path detection circuit 250 is further structured to determine a path interference event (e.g., an emergency occurrence such as an accident in the path of the vehicle 110). In this regard, a path interference event may cause traffic delays such that the use of the environment comfort system 130 may need to be extended. Accordingly, the component management circuit 260 may generate a command structured to manage the environment comfort system 130 in response to the determination of an accident in the path of the vehicle 110. Based on the determination of the accident in the path of the vehicle 110, the command generated may cause movement of one or more vehicle components 115 (e.g., the electronic auxiliary power unit (eAPU)) between the current performance level (e.g., enabled electrical powered accessories) and the adjusted performance level (e.g., disabled electrical powered accessories) such that the conserved electrical energy may be converted to manage the environment comfort system 130 as described herein above.

In further embodiments, the aftertreatment device temperature may be compared to the cabin temperature and/or the ambient temperature. If the ambient temperature is less than a temperature threshold (e.g., the temperature goes too low), one or more vehicle components 115 may be caused, via a command generated by the component management circuit 260, to move between a current performance level (e.g., the engine system is powered-off or non-engagement of an aftertreatment heating device) and an adjusted performance level (e.g., the engine system is powered-on or engagement of the aftertreatment heating device).

FIG. 3 is a flow diagram of an example process 300 for a vehicle management system to manage an environment comfort system via the circuitry described herein with reference to FIGS. 1-2. At 302, the process 300 includes determining, via the control system, a first time parameter corresponding to a vehicle proximate to a path location. The control system may determine the first time parameter, such as the arrival time, proximate to a bus stop. A second time parameter corresponding to a path schedule may be generated by the control system at 304. For example, the control system may determine the second time parameter corresponding to a bus schedule. The first time parameter and/or the second time parameter may be determined according to at least one of the path location or the path schedule utilized to generate a path pattern such that the first time parameter and/or the second time parameter is predicted.

At 306, a stop duration corresponding to the vehicle based, at least in part, on the first time parameter and the second time parameter may be determined by the control system. The one or more vehicle components may be associated with one or more parameters, such as the ambient temperature, cabin temperature, aftertreatment device temperature, etc., which may be received, via one or more sensors associated with the one or more vehicle components. In some examples, the environment comfort system (e.g., HVAC system) may be moved (e.g., powered on), while the engine system (e.g., the internal combustion engine) run time is reduced in response to the stop duration and/or the parameters (e.g., the ambient temperature, cabin temperature, etc.) determined.

A command structured to manage an environment comfort system in response to movement of one or more vehicle components between a current performance level and an adjusted performance level based on the stop duration may be generated by the control system at 308. The command may adjust the respective performance level of the one or more vehicle components such as the engine system, energy storage system, and/or the auxiliary power system to, thereby, manage the environment comfort system. An electrical load may be provided to the engine system to cause the engine system to efficiently increase its temperature (e.g., to cause the engine to heat up efficiently) responsive to movement of one or more vehicle components between a current performance level and an adjusted performance level. The electrical load, in turn, converts electrical energy which is conserved from the reduced use of the one more vehicle components to heat the vehicle by the environment comfort system. To that end, the electrical energy may be converted to manage the environment comfort system according to the stop duration determined.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit.

Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network. Where a circuit or portions of a circuit are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a computer or entirely on the computer or server. In the latter scenario, the computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope. No claim element herein is to be construed under the provisions of 35 U.S.C. § 112, sixth paragraph, unless the element is expressly recited using the phrase "means for.".

What is claimed is:

1. A controller structured to:
   determine a first time parameter corresponding to a vehicle proximate to a path location, wherein the vehicle comprises one or more vehicle components;
   determine a second time parameter corresponding to a path schedule; determine a stop duration corresponding to the vehicle based, at least in part, on the first time parameter and the second time parameter, the stop duration being a time duration when the vehicle stops and an engine of the vehicle continues to run: and
   adjust a thermal characteristic of an environment comfort system in response to movement of the one or more vehicle components between a current performance level and an adjusted performance level based on the stop duration determined.

2. The controller of claim 1, wherein the controller is further structured to generate a path pattern according to at least one of the path location or the path schedule associated with the vehicle comprising the one or more vehicle components.

3. The controller of claim 1, wherein the one or more vehicle components comprises at least one of an engine system, energy storage system, auxiliary power system, or aftertreatment device.

4. The controller of claim 1, wherein the controller is communicatively coupled to a location positioning system, and wherein the location positioning system is structured to provide path location data.

5. The controller of claim 4, wherein the location positioning system is structured to determine at least one of the first time parameter or the second time parameter.

6. The controller of claim 1, wherein the controller is further structured to:
   determine a path interference event; and
   generate the command structured to manage the environment comfort system in response to movement of the one or more vehicle components between the current performance level and the adjusted performance level based on the path interference event determined.

7. The controller of claim 1, wherein conserved electrical energy is converted to manage the environment comfort system.

8. The controller of claim 1, wherein the first time parameter comprises an arrival time and the second time parameter comprises a departure time.

9. The controller of claim 1, wherein the controller is further structured to determine one or more parameters associated with the one or more vehicle components, and wherein the one or more parameters comprises at least one of an ambient temperature, cabin temperature, or aftertreatment device temperature.

10. The controller of claim 1, wherein the vehicle comprises at least one of an on-road vehicle or off-road vehicle.

11. A method for managing an environment comfort system, the method comprising:
    determining, by a controller, a path interference event corresponding to a vehicle comprising an environment comfort system; and
    adjust, by the controller, a thermal characteristic of the environment comfort system in response to movement of the one or more vehicle components between a current performance level and an adjusted performance level based on the path interference event determined;
    communicatively coupling to a location positioning system, the location positioning system structured to at least one of provide path location data or determine at least one of a first time parameter corresponding to the vehicle proximate to the path location or a second time parameter corresponding to a path schedule, the first time parameter comprising an arrival time and the second time parameter comprising a departure time.

12. The method of claim 11, wherein the method further comprises generating a path pattern according to at least one of a path location or path schedule associated with the vehicle comprising one or more vehicle components.

13. The method of claim 12, wherein the one or more vehicle components comprises at least one of an engine system, energy storage system, auxiliary power system, or aftertreatment device.

14. The method of claim 11, wherein conserved electrical energy is converted to manage the environment comfort system.

15. The method of claim 11, further comprising determining one or more parameters associated with one or more vehicle components of the vehicle, and wherein the one or more parameters comprises at least one of an ambient temperature, cabin temperature, or aftertreatment device temperature.

16. A system comprising:
    a control system communicatively coupled to a location positioning system, the control system, including a controller, structured to:
    determine a first time parameter corresponding to a vehicle proximate to a path location;
    determine a second time parameter corresponding to a path schedule;
    determine a stop duration corresponding to the vehicle based, at least in part, on the first time parameter and the second time parameter, the stop duration being a time duration when the vehicle stops and an engine of the vehicle continues to run; and
    adjust a thermal characteristic of an environment comfort system in response to movement of one or more vehicle components between a current performance level and an adjusted performance level based on the stop duration determined.

17. The system of claim 16, wherein the control system is further structured to generate a path pattern according to at least one of the path location or the path schedule associated with the vehicle.

18. The system of claim 16, wherein the one or more vehicle components comprises at least one of an engine system, energy storage system, auxiliary power system, or aftertreatment device.

* * * * *